United States Patent
Kim et al.

(10) Patent No.: US 11,349,320 B2
(45) Date of Patent: May 31, 2022

(54) WIRELESS POWER TRANSMITTING DEVICE

(71) Applicant: LG ELECTRONICS INC., Seoul (KR)

(72) Inventors: Sungkyu Kim, Seoul (KR); Seonghun Lee, Seoul (KR); Bongsik Kwak, Seoul (KR); Jihyun Lee, Seoul (KR); Joonho Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 197 days.

(21) Appl. No.: 16/742,374

(22) Filed: Jan. 14, 2020

(65) Prior Publication Data

US 2020/0227932 A1 Jul. 16, 2020

(30) Foreign Application Priority Data

Jan. 14, 2019 (KR) .................. 10-2019-0004589

(51) Int. Cl.
*H02J 7/00* (2006.01)
*H02J 50/80* (2016.01)
*H02J 50/12* (2016.01)
*H02J 50/40* (2016.01)

(52) U.S. Cl.
CPC ........ *H02J 7/00309* (2020.01); *H02J 7/0024* (2013.01); *H02J 50/12* (2016.02); *H02J 50/40* (2016.02); *H02J 50/80* (2016.02)

(58) Field of Classification Search
CPC ...... H02J 7/00309; H02J 50/80; H02J 7/0024; H02J 50/12; H02J 50/40; H02J 7/00034; H02J 50/10; H02J 50/402; H01F 38/14; H01F 27/085

See application file for complete search history.

(56) References Cited

U.S. PATENT DOCUMENTS

| | | | |
|---|---|---|---|
| 2018/0301936 A1* | 10/2018 | Lee | H02J 50/12 |
| 2020/0083726 A1* | 3/2020 | Kim | H02J 50/00 |

FOREIGN PATENT DOCUMENTS

| | | | | |
|---|---|---|---|---|
| KR | 10-2014-0060798 A | 5/2014 | | |
| KR | 10-2019-0001161 A | 1/2019 | | |
| WO | WO-2019107779 A1 * | 6/2019 | ............. | H01F 27/28 |

* cited by examiner

*Primary Examiner* — Nghia M Doan
(74) *Attorney, Agent, or Firm* — Birch, Stewart, Kolasch & Birch, LLP

(57) ABSTRACT

The present invention relates to a wireless power transmitting device. The wireless power transmitting device comprises a transmitter coil section with a plurality of partially overlapping transmitter coils; a fan for cooling heat generated by the transmitter coil section; and a controller for sending out a detection signal through the transmitter coil section, calculating the number of operating coils based on the strength of a response signal to the detection signal, and controlling the fan based on the calculated number of operating coils. Accordingly, heat generated by the transmitter coils can be reduced more efficiently.

20 Claims, 9 Drawing Sheets ant of the present invention pro- # WIRELESS POWER TRANSMITTING DEVICE

CROSS-REFERENCE TO RELATED APPLICATION

This application claims priority to and the benefit of Korean Patent Application No. 10-2019-0004589 filed in the Korea Intellectual Property Office on Jan. 14, 2019, which is fully incorporated by reference into the present application.

BACKGROUND OF THE INVENTION

Field of the Invention

The present invention relates to a wireless power transmitting device and, more particularly, to a wireless power transmitting device capable of reducing heat generated by a transmitter coil more efficiently during wireless power transfer.

Related Art

Methods for supplying power to an electronic device include a terminal supplying method in which physical cables or wires are connected to a commercial power source and an electronic device. Disadvantages to such a terminal supplying method are that the cables or wires take up a lot of space, are not easy to tidy up, and pose a risk of breakage. To solve these problems, research on wireless power transmission methods is now being discussed.

A wireless power transmission system can comprise a wireless power transmitting device for supplying power via a single coil or multiple coils and a wireless power receiving device for receiving and using power supplied wirelessly from the wireless power transmitting device.

However, the temperature of a transmitter coil increases with increasing transmission power, and, there is a need to protect the user from overload due to heat generation, product burnout, explosion, etc., especially when charging a large-capacity wireless power transmitting device.

Meanwhile, the "Wireless charging device" disclosed in KR10-2019-0001161 proposes a method of charging a mobile terminal such as a mobile phone or laptop via a wireless charging coil.

However, the above "Wireless charging device" does not mention at all about measures for reducing heat generated when charging a large-capacity terminal such as a laptop.

Meanwhile, the "Wireless charging device" disclosed in KR10-2014-0060798 discloses a configuration in which the wireless charging device comprises a temperature sensor for sensing a temperature change in a device being charged.

However, measuring the temperature of a device using a temperature has problems like an increase of the cost of the product and the need to change the product design.

SUMMARY OF THE INVENTION

The present invention provides a wireless power transmitting device capable of efficiently reducing heat generated by multiple transmitter coils which partially overlap each other.

The present invention also provides a wireless power transmitting device capable of efficiently varying the method of communication depending on the amount of power of a wireless power receiving device.

An exemplary embodiment of the present invention provides a wireless power transmitting device comprising a transmitter coil section with a plurality of partially overlapping transmitter coils: a fan for cooling heat generated by the transmitter coil section; and a controller for sending out a detection signal through the transmitter coil section, calculating the number of operating coils based on the strength of a response signal to the detection signal, and controlling the fan based on the calculated number of operating coils.

Another exemplary embodiment of the present invention provides a wireless power transmitting device comprising: a transmitter coil section with a plurality of partially overlapping transmitter coils: a fan for cooling heat generated by the transmitter coil section; and a controller for calculating the power of a wireless power receiving device based on unique information of the wireless power receiving device which is received through the transmitter coil section, changing the method of communication with the wireless power receiving device based on the calculated power, and controlling the fan based on whether the method of communication is changed or not.

DESCRIPTION OF THE EMBODIMENTS

Hereinafter, the embodiments of the present invention will be described in more details with reference to the drawings.

The suffixes "module", "part", and "section" of elements herein are used for convenience of description, and thus can be used interchangeably and do not have any distinguishable meanings or functions.

The terms including "first," "second," and the like can be used to describe various elements, but the elements are not limited by the terms. The terms, if any, are used for distinguishing between one element and other elements.

The term "comprises" or "has" described herein should be interpreted not to exclude presence or addition possibility of characteristics, numbers, steps, operations, constituent elements, parts, or combinations thereof described in the specification but to designate presence of one or more other characteristics, numbers, steps, operations, constituent elements, parts, or combinations thereof.

Figure 1:
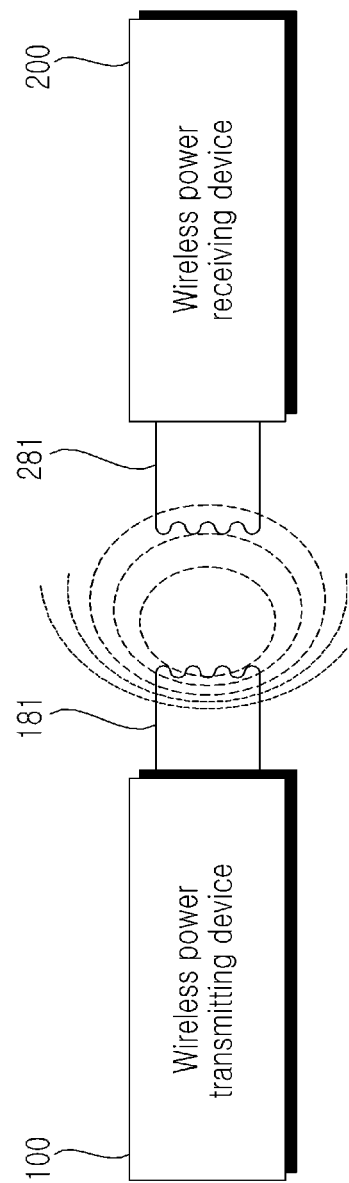
FIG. 1 shows an example of an internal block diagram of a wireless power system according to an exemplary embodiment of the present invention.

FIG. 1 shows an example of an internal block diagram of a wireless power system according to an exemplary embodiment of the present invention.

Referring to the drawing, the wireless power system 10 can comprise a wireless power transmitting device 100 for wirelessly transmitting power and a wireless power receiving device 200 for receiving wirelessly transmitted power.

The wireless power transmitting device 100 can transfer power to the wireless power receiving device 200 by using electromagnetic induction which induces a current in a receiver coil 281 by changing the magnetic field of a coil 181. In this case, the wireless power transmitting device 100 and the wireless power receiving device 200 can use an electromagnetic inductive wireless charging method defined in the WPC (Wireless Power Consortium) or the PMA (Power Matters Alliance). Alternatively, the wireless power transmitting device 100 and the wireless power receiving device 200 can use a magnetic resonant charging method defined in the 4AWP (Alliance for Wireless Power).

The wireless power transmitting device 100 can wirelessly transmit power and charge the wireless power receiving device 200.

In some embodiments, one wireless power transmitting device 100 can charge a plurality of wireless power receiving devices 200. In this case, the wireless power transmitting device 100 can distribute and transmit power to a plurality of wireless power receiving devices 200 in a time-division manner, but the present invention is not limited to this, and, in another example, the wireless power transmitting device 100 can distribute and transmit power to a plurality of wireless power transmitting devices 200 by using a different frequency band allocated to each wireless power receiving device 200. The number of wireless power receiving devices 200 that can be connected to one wireless power transmitting device 100 can be adaptively determined in consideration of the amount of power required for each wireless power receiving device 200, the amount of power available to the wireless power transmitting device 100, and so on.

In another embodiment, a plurality of wireless power transmitting devices 100 can charge at least one wireless power receiving device 200. In this case, the at least one wireless power receiving device 200 can be connected simultaneously to the plurality of wireless power transmitting devices 100, and can receive power simultaneously from the connected wireless power transmitting devices 100 and perform charging. In this case, the number of wireless power transmitting devices 100 can be adaptive determined in consideration of the amount of power required for each wireless power receiving device 200, the amount of power available to the wireless power transmitting devices 100, and so on.

The wireless power receiving device 200 is able to receive power transmitted from the wireless power transmitting devices 100.

For example, the wireless power receiving device 200 can be a mobile phone, a laptop computer, a wearable device such as a smart watch, a PDA (personal digital assistant), a PMP (portable multimedia player), a navigation device, an MP3 player, an electric toothbrush, a lighting device, or a remote control, but the present invention is not limited to them and any electronic device capable of charging a battery will suffice.

The wireless power transmitting device 100 and the wireless power receiving device 200 can communicate in both directions. In some embodiments, the wireless power transmitting device 100 and the wireless power receiving device 200 can communicate in one direction or in half-duplex mode.

The method of communication used herein can be in-band communication which uses the same frequency band and/or out-of-band communication which uses different frequency bands.

In an example, information exchanged between the wireless power transmitting device 100 and the wireless power receiving device 200 can include information on each other's status, power usage information, battery charging information, battery output voltage/current information, control information, and so on.

Figure 2:
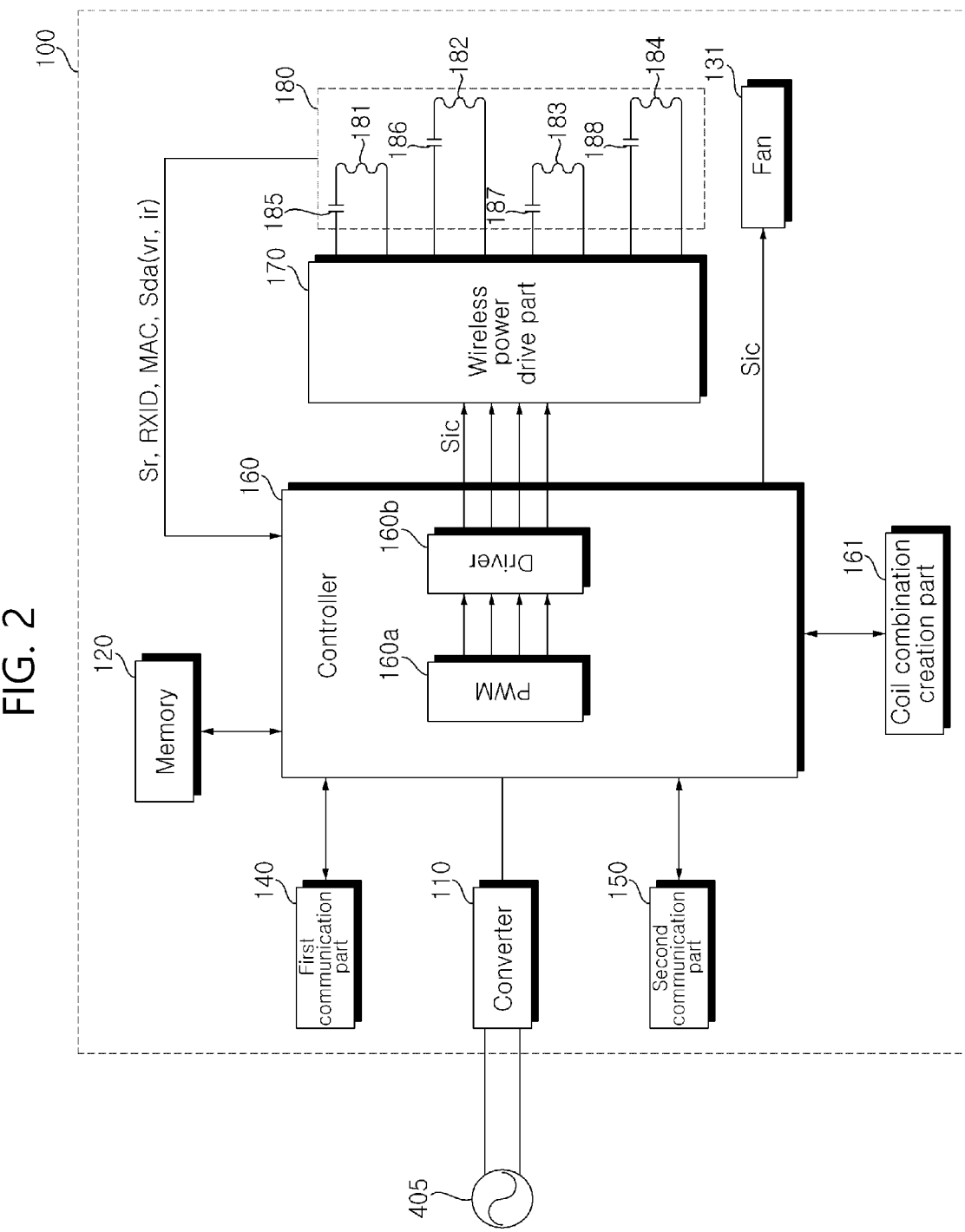
FIG. 2 is an internal block diagram of a wireless power transmitting device in the wireless power system of FIG. 1.

FIG. 2 is an internal block diagram of a wireless power transmitting device in the wireless power system of FIG. 1.

Referring to the drawing, the wireless power transmitting device 100 can comprise a converter 110 for converting commercial alternating current power 405 into direct current power, a wireless power drive part 170 for converting direct current into alternating current, a transmitter coil section 180 for wirelessly transmitting power using the converted alternating current, and a fan 131 for cooling heat generated by the transmitter coil section 180. The fan 131 can generate air to cool down the transmitter coil section 180.

The wireless power transmitting device 100 can further comprise a controller 160 for controlling internal components in the wireless power transmitting device 100 for power transfer and communication, a coil combination creating part 161 for creating a coil combination including at least one of a plurality of coils 181 to 184, and a first communication part 140 and a second communication part 150 for communicating with the wireless power receiving device 200 by a predetermined method of communication, and a memory 120 storing a control program, etc. for driving the wireless power transmitting device 100.

The wireless power transmitting device 100 operates on direct current power, and this direct current power can be supplied by the converter 110 which converts commercial alternating current power into direct current power.

The converter 110 can convert the commercial alternating current power 405 into direct current power and output it. Although the drawing illustrates that the commercial alternating current power 405 is single-phase alternating current power, it can be a three-phase alternating current power. The internal structure of the converter 100 can vary with the type of the commercial alternating current power 405.

Meanwhile, the converter 110 can have diodes but no switching element and perform rectifying operation without any switching operation.

For example, a single-phase alternating current power source can use four diodes in a bridge configuration, and a three-phase alternating current power source can use six diodes in a bridge configuration.

Meanwhile, the converter 110 can be, for example, a half-bridge converter in which two switching elements and four diodes are connected, and the three-phase alternating current power source can use six switching elements and six diodes.

When direct current power from the converter 110 is supplied to the wireless power drive part 170, the controller 160 controls the power drive part 170 during wireless power transmission to wirelessly transmit power to the wireless power receiving device 200. In this case, the wireless power drive part 170 can convert direct current into alternating current power for wireless power transmission.

Specifically, the controller 160 can comprise a PWM generator 160a for generating a PWM signal and a driver 160b for creating and outputting a drive signal Sic based on the PWM signal.

The controller 160 can determine the duty cycle of the PWM signal based on the amount of power transmitted, the amount of current flowing through the wireless power drive part 170. The PWM generator 160a ma generate a PWM signal based on the duty cycle of the PWM signal. The driver 160b can output an activation signal Sic for activating the wireless power drive part 170 based on the PWM signal.

The wireless power drive part 170 can have at least one switching element for converting direct current power into alternating current power. For example, if the switching element is an IGBT, a gate drive signal can be outputted from the driver 160b and inputted into a gate terminal of the switching element. Also, the switching element can perform switching operation in response to the gate drive signal. By the switching operation of the switching element, direct current power can be converted into alternating current power and outputted to the transmitter coil section 180.

In some embodiments, the wireless power drive part 170 can be included as a component of the controller 160.

The transmitter coil section 180 can comprise a plurality of coils 181 to 184 (hereinafter, referred to as 181 if they do not need to be distinguished). The plurality of coils 181 to 184 can partially overlap each other.

The transmitter coil section 180 can wirelessly transmit power to the wireless power receiving device 200 through one combination of coils selected from the plurality of coils 181 to 184.

Figure 3:
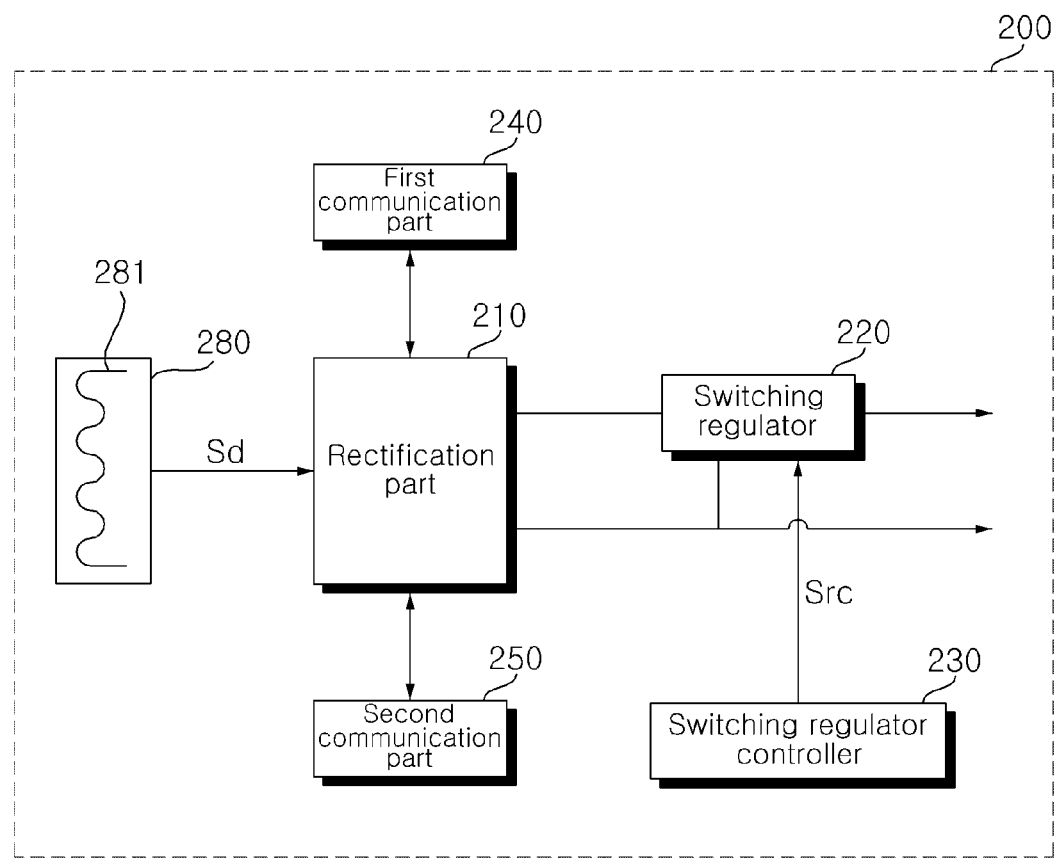
FIG. 3 is an internal block diagram of a wireless power receiving device in the wireless power system of FIG. 1.

The plurality of coils 181 to 184 also can be called a plurality of transmitter coils 181 to 184 so that they can be distinguished from the receiver coil 281 of FIG. 3.

Meanwhile, the plurality of transmitter coils 181 to 184 can have high leakage inductance because they are spaced apart from the receiver coil 281, and can have low transmission efficiency because of their low coupling factor.

Therefore, the wireless power transmitting device 100 of the present invention can form a resonant circuit, together with the receiving coil 281, by connecting a capacitor to each of the plurality of transmitter coils 181 to 184, in order to improve transmission efficiency.

The transmitter coil section 180 can comprise a plurality of transmitter coils 181 to 184 and a plurality of capacitor elements 185 to 188 connected respectively to the plurality of coils 181 to 184.

The plurality of capacitor elements 185 to 188 can be respectively connected in series to the plurality of transmitter coils 181 to 184 to form a resonant circuit.

In some embodiments, unlike in FIG. 2, the plurality of capacitor elements 185 to 188 can be respectively connected in parallel to the plurality of transmitter coils 181 to 184 to form a resonant circuit.

The plurality of transmitter coils 181 to 184 and the plurality of capacitor elements 185 to 188 can determine the resonant frequency of power transmission.

Meanwhile, the transmitter coil section 180 also can be called a resonant circuit part since the capacitor elements and transmitter coils in the transmitter coil section 180 form a resonant circuit. Alternatively, the transmitter coil section 180 also can be called a coil section.

The transmitter coil section 180 can further comprise a shield (190 of FIG. 4) placed on one side of the plurality of transmitter coils 181 to 184 to shield leaking magnetic fields.

Meanwhile, the controller 160 can send out a detection signal (Sd of FIG. 3) through the plurality of transmitter coils 181 to 184 in the transmitter coil section 180 and receive a response signal Sr as a response to the detection signal Sd.

The detection signal Sd can be a digital ping (DP) signal for identifying whether an object on a charging surface is a wirelessly chargeable receiver or not.

The response signal Sr can be a signal indicating the strength of the power received by the wireless power receiving device 200.

For example, the higher the strength of the response signal Sr, the greater the power received by the wireless power receiving device 200. In contrast, the lower the strength of the response signal Sr, the smaller the power received by the wireless power receiving device 200.

The controller 160 can transmit the detection signal Sd simultaneously or sequentially through the plurality of transmitter coils 181 to 184.

Also, the controller 160 can receive unique information RXID of the wireless power receiving device 200 through the plurality of transmitter coils 181 to 184 in the transmitter coil section 180. The controller 160 can calculate the power of the wireless power receiving device 200 based on the unique information RXID.

Moreover, the controller 160 can receive a MAC address through the plurality of transmitter coils 181 to 184 in the transmitter coil section 180. The controller 160 can perform pairing with the wireless power receiving device 200 based on the MAC address.

In addition, the controller 160 can receive sensing data Sda at predetermined intervals through the plurality of transmitter coils 181 to 184 in the transmitter coil section 180. The sensing data Sd can correspond to the current it flowing through the receiver coil 281 and/or the voltage Vr between both ends of the receiver coil 281.

Meanwhile, the amount of heat generated from the transmitter coil section 180 can increase as the amount of power transmitted by the wireless power transmitting device 100 increases.

The present invention can comprise a fan 131 for cooling heat generated by the transmitter coil section 180.

The controller 160 can control the operation of the fan 131. Specifically, the controller 160 can output a control signal Sic to the fan 131 to drive the fan 131. The fan 131 can be driven based on the control signal Sic.

The controller 160 can drive or stop the fan 131. More specifically, if there are a preset reference number of operating coils or more, the controller 160 can control the fan 131 to be driven.

Even if there are fewer operating coils than the reference number, the controller 160 can control the fan 131 to be driven as long as at least one coil is in fast charging mode.

Alternatively, the controller 160 can control the fan 131 to be driven if is communicating out of band (OOB) with the wireless power receiving device 200.

In addition, if the current flowing through the receiver coil 281 or the voltage between both ends of the receiver coil 281 is equal to or higher than a reference value, the controller 160 can control the fan 131 to keep it running. If the current flowing through the receiver coil 281 or the voltage between both ends of the receiver coil 281 is lower than the reference value, the controller 160 can control the rotation speed of the fan 131 to correspond to the current flowing through the receiver coil 281 or the voltage between both ends of the receiver coil 281.

Meanwhile, the present invention can further comprise a fan driver for driving the fan, and the controller 160 can transmit a control signal Sic to the fan driver to drive the fan 131. The fan driver can control the speed of rotation of the fan based on the control signal Sic.

The coil combination creator 161 can create a combination of coils including at least one of the plurality of transmitter coils 181 to 184.

The first communication part 140 can communicate with the wireless power receiving device 200 in a first communication method. The first communication part 140 can process status information, power control information, etc. of the wireless power transmitting device 100 into a predetermined signal and transmit it to the wireless power receiving device 200, and can receive status information, power usage information, charging efficiency information, etc. of the wireless power receiving device 200, process them into a predetermined signal, and then transmit it to the controller 160.

The second communication part 150 can communicate with the wireless power receiving device 200 in a second communication method which is different from the first communication method. Likewise, the second communication part 150 can process status information, power control information, etc. of the wireless power transmitting device 100 into a predetermined signal and transmit it to the wireless power receiving device 200, and can receive status information, power usage information, charging efficiency information, etc. of the wireless power receiving device 200, process them into a predetermined signal, and then transmit it to the controller 160.

The first communication part 140 and the second communication part 150 can further comprise a modulation/demodulation part for modulating and demodulating a data signal sent out from the wireless power transmitting device 100 and a data signal received from the wireless power receiving device 200.

Also, the first communication part 140 and the second communication part 150 can further comprise a filtering part for filtering a data signal from the wireless power receiving device 200. In this case, the filtering part can have a band pass filter (BPF).

Meanwhile, the first communication method can be in-band communication method which uses the same frequency band as the wireless power receiving device 200, and the second communication method can be out-of-band communication band which uses a different frequency band from the wireless power receiving device 200.

The wireless power transmitting device 100 can change the method of communication based on power information of the wireless power receiving device 200.

The memory 120 can store a program for running the wireless power transmitting device 100.

Moreover, the memory 120 can store the strength of each object detection signal sent out from a plurality of coils, in order to detect an object on the charging surface.

In addition, the memory 120 can store the strength of each coil selection signal sent out from a plurality of coils.

In this case, the strength of an object detection signal and the strength of a coil selection signal can be factory-calibrated.

Figure 4:
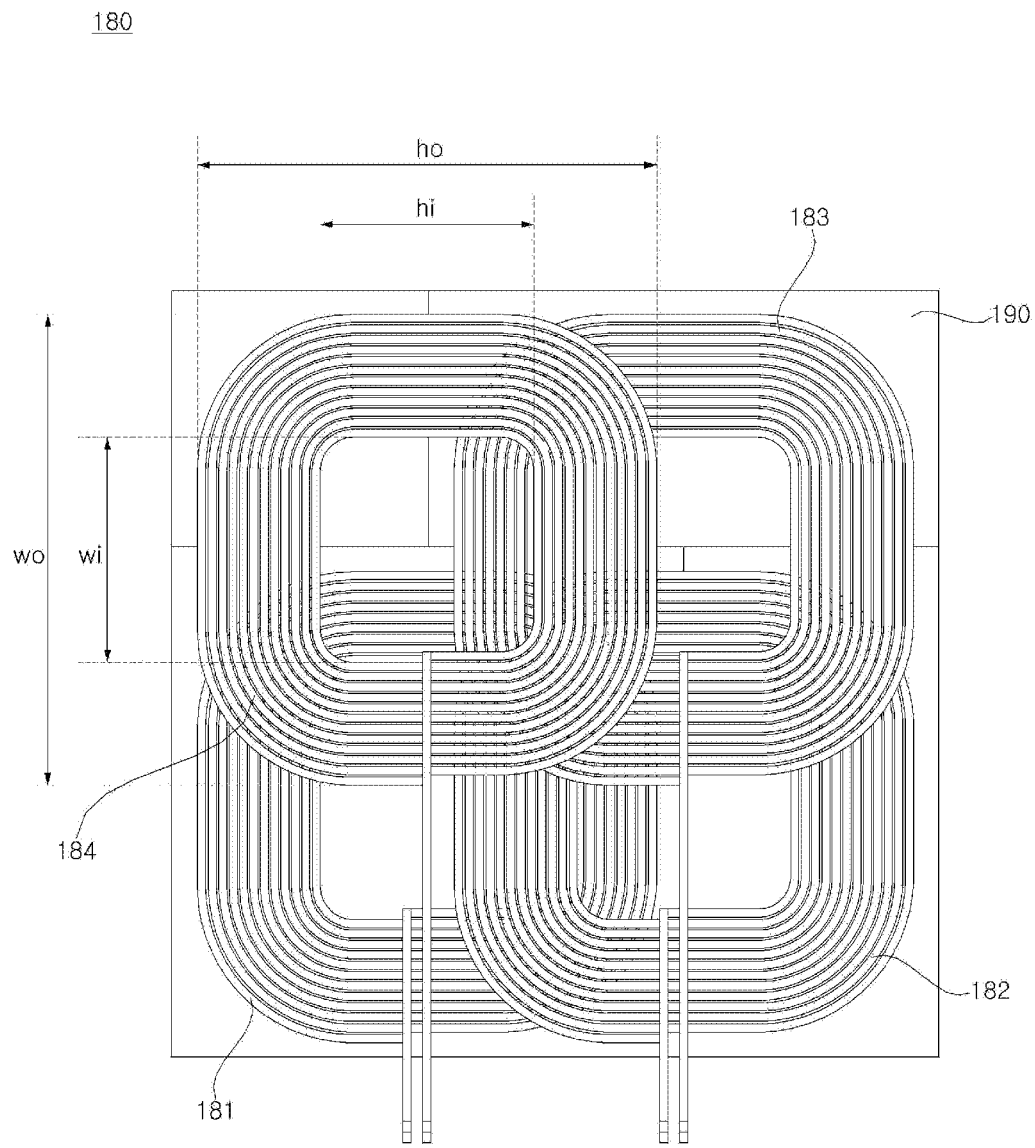
FIG. 4 is a view for explaining a structure of the coil section of FIG. 2.

Specifically, since the plurality of transmitter coils 181 to 184 in the present invention partially overlap each other to form a layer as shown in FIG. 4, when each coil sends out an object detection signal and a coil selection signal at the same strength, the object detection signal and coil selection signal can have a different strength on the charging surface where the wireless power receiving device 200 is placed.

The difference in the strength of the object detection signal and coil selection signal on the charging surface can cause an error in detecting an object and combining operating coils.

To solve this problem occurring in the present invention, the strength of the object detection signal and the strength of the coil selection signal can be set by compensating for the distance between each coil and the charging surface where the wireless power receiving device 200 is placed.

For example, the strength of the object detection signal and the strength of the coil selection signal can be set to increase as the distance between the charging surface and each coil becomes greater.

Accordingly, the strength of each object detection signal on the charging surface where the wireless power receiving device 200 is placed can be the same. Likewise, the strength of each coil selection signal on the charging surface can be the same. Meanwhile, the strength of a compensated object detection signal and the strength of a compensated coil selection signal are factory-calibrated values and can be stored in the memory 120.

Particularly, the memory 120 can store a reference strength for a response signal to a detection signal.

For example, the memory 120 can store a first reference strength for a response signal used to calculate the number of operating coils that will perform power transmission. Also, the memory 120 can store a second reference strength for a response signal to calculate whether the operating coils are in fast charging mode or not.

Alternatively, the memory 120 can store a reference power level based on which the method of communication changes.

Moreover, the memory 120 can store a reference value of the current flowing through the receiving coil 281 or reference value of the voltage between both ends of the receiving coil 281, which is used to control the speed of rotation of the fan 131.

The controller 160 can control the overall operation of the wireless power transmitting device 100.

The controller 160 can select a combination of operating coils to be used for wireless power transmission from among coil combinations created by the coil combination creation part 161, and can charge the wireless power receiving device 200 through the selected combination of operating coils.

Specifically, the controller 160 can send out a coil selection signal through the coils included in the coil combination and receive a coil selection response signal as a response to the coil selection.

In addition, the controller 160 can select a combination of operating coils to be used for wireless power transmission from among a number of coil combinations based on the strength of the coil selection response signal and the charging efficiency of the wireless power receiving device 200.

The controller 160 can wirelessly transmit power to the wireless power receiving device 200 through a combination of operating coils.

Meanwhile, the coil combination creation part 161 can send out an object detection signal through the plurality of transmitter coils 181 to 184 and calculate the number of ineffective coils based on the amount of current change in response to the object detection signal.

Moreover, the coil combination creation part 161 can create a combination of effective coils, not the ineffective coils, from the plurality of transmitter coils 181 to 184.

In this case, the controller 160 can select a combination of operating coils to be used for wireless power transmission from among a number of combinations of effective coils.

Meanwhile, the coil combination creation part 161 can calculate the power of the wireless power receiving device 200 based on unique information of the wireless power receiving device 200 which is received through the transmitter coil section 180, and can calculate the number of operating coils based on the calculated power of the wireless power receiving device 200.

Additionally, the coil combination creation part 161 can create a coil combination depending on the number of operating coils.

Meanwhile, the coil combination creation part 161 can be a component included in the controller 160, unlike in FIG. 2. That is, the coil combination creation part 161 can be implemented as some component of the controller 160.

FIG. 3 is an internal block diagram of a wireless power receiving device in the wireless power transmission system of FIG. 1.

Referring to the drawing, the wireless power receiving device 200 can comprise a power receiving part 280 for receiving wireless power from the wireless power transmitting device 100, a rectification part 210 for rectifying the received wireless power, a switching regulator 220 for stabilizing the rectified wireless power, and a switching regulator controller 230 for outputting operating power to a load by controlling the switching regulator 220.

The wireless power receiving device 200 can further comprise a first communication part 240 and second communication part 250 for communicating with the wireless power transmitting device 100.

The power receiving part 280 can receive wireless power transmitted from the transmitter coil section 180. To this end, the power receiving part 280 can have a receiver coil 281.

A magnetic field produced in any one of the plurality of transmitter coils 181 to 184 can generate an induced electromotive force in the receiver coil 281. Wireless power produced by the induced electromotive force can be supplied directly to a load through the rectification part 210 and switching regulator 220 to be described later, or, if the load is a battery, the power can be used to charge the battery.

The receiver coil 281 can have a conductive thin-film pattern on a printed circuit board (PCB). The receiver coil 281, which is in the shape of a closed loop, can be printed on a receiving pad. The receiver coil 281 can be wound with its polarity going the same direction.

Meanwhile, the wireless power receiving device 200 can further comprise a capacitor element for forming a resonant circuit together with the transmitter coil section 180 in the wireless power transmitting device 100. In this case, the capacitor element can be connected in series or in parallel to the receiver coil 281.

Meanwhile, the wireless power receiving device 200 can receive a detection signal Sd transmitted by the wireless power transmitting device 100, through the receiver coil 281.

Also, the wireless power receiving device 200 can send out a response signal Sr as a response to the detection signal Sd, through the receiver coil 281.

The rectification part 210, upon receiving wireless power from the wireless power transmitting device 100, can rectify wireless power received through the receiver coil 281. The rectification part 210 can comprise at least one diode element.

The switching regulator 220 can output the rectified wireless power as charging power (v) to be supplied to the battery, by control from the switching regulator controller 230.

The switching regulator controller 230 can apply a regulator control signal Src to the switching regulator 220 to control the switching regulator 220 to output charging power (v).

Meanwhile, the switching regulator 220 can regulate output voltage by DC-DC conversion in response to the regulator control signal Src from the switching regulator controller 230. The switching regulator 220 can output charging power (v) having a designated amount of voltage by controlling output voltage based on the regulator control signal Src.

Meanwhile, the wireless power receiving device 200 does not comprise any microprocessor, and, when rectified charging power (v) having a predetermined amount of voltage is outputted by the switching regulator 220, the switching regulator can be controlled by the switching regulator controller 230. The wireless power receiving device 200 with no microprocessor has advantages like simplifying the hardware configuration and reducing power consumption.

Figure 5:
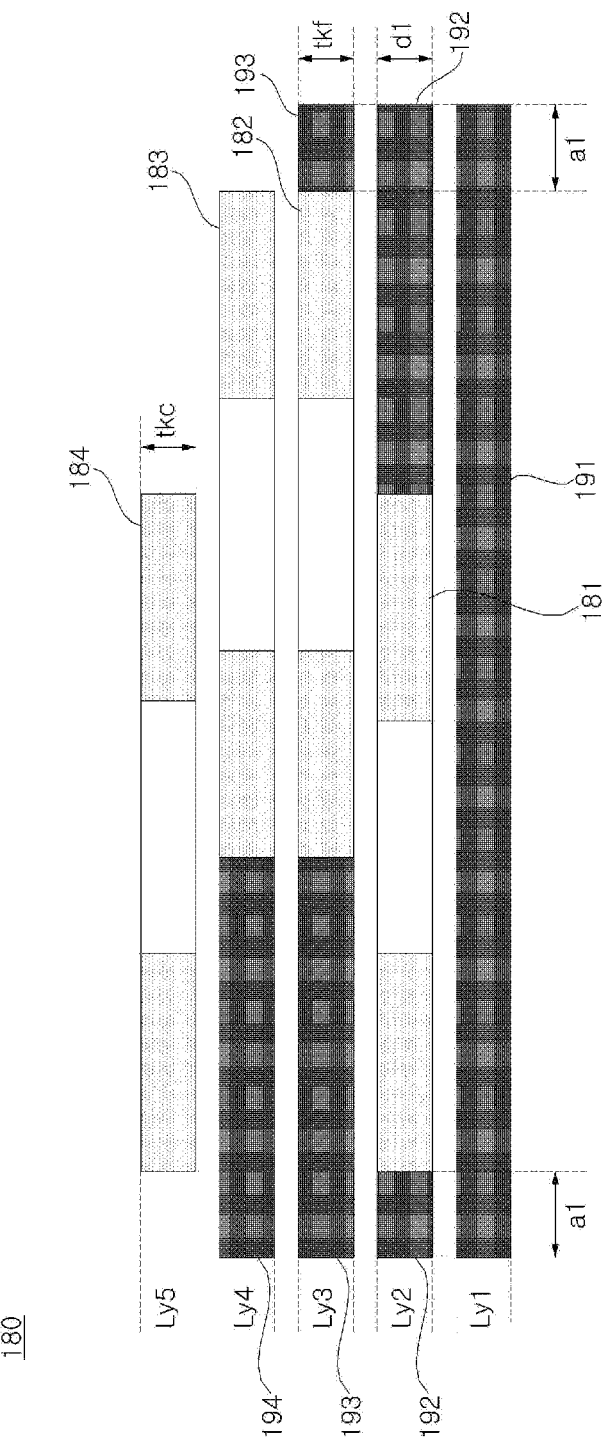
FIG. 5 is a perspective view showing a layered structure of the coil section of FIG. 4.

FIG. 4 is a view for explaining a structure of the coil section of FIG. 2. FIG. 5 is a perspective view showing a layered structure of the coil section of FIG. 4.

Referring to the drawing, the transmitter coil section 180 according to an exemplary embodiment of the present invention can comprise first to fourth coils 181 to 184.

Since the transmitter coil section 180 has first to fourth coils 181 to 184, rather than a single large coil, the degree of freedom of the charging surface can be improved, and, at the same time, any decrease in power efficiency due to stray magnetic fields can be prevented.

The first to fourth coils 181 to 184 can be disposed to partially overlap each other. Specifically, as shown in FIG. 4, the first coil 181 and the second coil 182 can partially overlap each other, the second coil 182 and the third coil 183 can partially overlap each other, and the third coil 183 and the fourth coil 184 can partially overlap each other.

The overlapping regions between the first to fourth coils 181 to 184 can be configured to have the smallest dead zone where charging is not available. Specifically, the overlapping regions between the first to fourth coils 181 to 184 can be configured in such a way that the dead zone at the center of the charging area is the smallest.

The first to fourth coils 181 to 184 can be manufactured to have a preset inner length (ho), inner length (hi), outer width (wo), inner width (wi), thickness, and number of windings. Also, the first to fourth coils 181 to 184 can have the same inner length (ho), inner length (hi), outer width (wo), and inner width (wi).

Meanwhile, because the fourth coil 184 is placed closest to the wireless power receiving device 200, the inductance of the fourth coil 184 can be set lower than the inductance of the first to third coils 181 to 183. This is to achieve constant power transmission on the surface of the transmitter coil section 180 or constant power efficiency.

The first to fourth coils 181 to 184 can be placed over a shield 190. The shield 190 can comprise ferrite which is composed of a combination of one or two types of elements selected from the group consisting of cobalt (Co), iron (Fe), nickel (Ni), boron (B), and silica (Si). The shield 190 can be placed on one side of the coils, shield leaking magnetic fields, and optimize the orientation of the magnetic fields.

The shield 190 can cover a larger area than where the first to fourth coils 181 to 184 are placed. For example, as shown in FIGS. 4 and 5, the shield 190 can be elongated in increments of al from the horizontal edges of the first to fourth coils 181 to 184. Likewise, the shield 190 can be elongated in a1 increments from the longitudinal edges of the first to fourth coils 181 to 184.

Since the shield 190 becomes longer beyond the outer length of the first to fourth coils 181 to 184, leaking magnetic fields can be reduced, and the orientation of the magnetic fields can be optimized.

Meanwhile, since the first to fourth coils 181 to 184 are configured to partially overlap each other, the non-overlapping regions can become loosened. For example, as shown in FIG. 5, a gap distance dl can be created in the non-overlapping regions since the first coil 181 and the second coil 182 only partially overlap each other.

Due to this gap distance, leaking magnetic fields in the second coil 182 are not shielded, which can lead to a reduction in the transmission efficiency of the wireless power transmitting device 100 and distribution of the orientation the magnetic fields. Moreover, due to this gap distance, the wireless power transmitting device 100 can be easily broken by external impact.

To overcome these problems occurring in the present invention, the first to fourth coils 181 to 184 and the shield 190 can form a layered structure.

More specifically, a base shield 191 can be placed on a first layer ly1 of the transmitter coil section 180.

The first coil 181 and a first shield 192 can be placed on a second layer ly2 which is located above the base shield 191.

The second coil 182, which partially overlaps the first coil 181, can be placed on a second layer ly2 which is located above the first coil 181. In this case, the first shield 192 placed on the second layer ly2 prevents loosening caused by the overlapping structure of the first coil 181 and second coil 182.

Based on the same principle, a second shield 192, as well as the second coil 182, can be placed on a third layer ly3 of the transmitter coil section 180.

The third coil 183, which partially overlaps the second coil 182, can be placed on a fourth layer ly4 which is located above the second coil 182. In this case, the second shield 193 placed on the third layer ly3 prevents loosening caused by the overlapping structure of the second coil 182 and third coil 183.

Also, a third shield 194, as well as the third coil 183, can be placed on the fourth layer ly4 of the transmitter coil section 180, and the third shield 194 can prevent loosening caused by the overlapping structure of the third coil 183 and fourth coil 184.

Moreover, the thickness tkf of the shield 190 is preferably the same as the thickness tkc of the first to fourth coils 181 to 184, because the first to fourth coils 181 to 184 need to be bonded to the shield 190 (including the base shield 191 and the first to third shields 192 to 194).

Although FIG. 5 illustrates that the layers of the transmitter coil section 180 are spaced apart from each other, this is only for illustrative purposes and the layers of the transmitter coil section 180 can be closely attached to each other.

The configuration of the transmitter coil section 180 shown in FIG. 5 helps prevent the partially overlapping, first to fourth coils 181 to 184 from becoming loosened, and, at the same time, prevent the first to fourth coils 181 to 184 from coming off due to external impact.

In addition, since the shield 190 is placed on one side of each coil, leaking magnetic fields can be shielded, and the orientation of the magnetic fields is more concentrated, thereby increasing transmission efficiency.

Furthermore, since the shield 190 is placed on one side of each coil, heat generated from multiple coils can be easily reduced.

Meanwhile, the first to fourth coils 181 to 184 can be contained in a casing that is not shown for convenience of explanation. The wireless power receiving device 200 can be placed on one side of the casing. In the case where the wireless power receiving device 200 can be placed on one side of the casing, the transmitter coil section 180 can wirelessly transmit power to charge the wireless power receiving device 200. Therefore, the one side of the casing where the wireless power receiving device 200 is placed can be called a charging surface. Also, the terms "charging surface" and "interface surface" can be interchangeably used.

Figure 6:
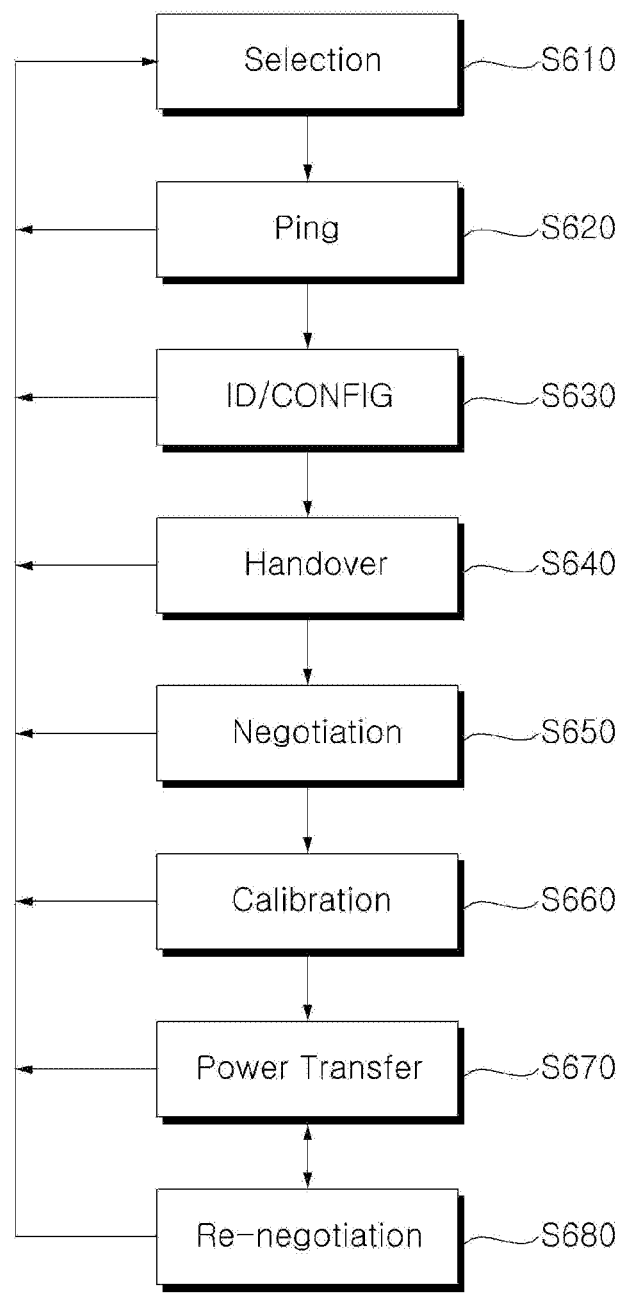
FIG. 6 is a flowchart for explaining a wireless power transmission method according to an exemplary embodiment of the present invention.

FIG. 6 is a flowchart for explaining a wireless power transmission method according to an exemplary embodiment of the present invention.

Referring to the drawing, wireless power transfer can comprise a selection phase S610, a ping phase S620, an identification and configuration phase S630, a handover phase S640, a negotiation phase S650, a power transfer phase S670, and a re-negotiation phase S680.

First of all, in the selection phase S610, the wireless power transmitting device 100 can detect whether there are objects within a detection area.

The wireless power transmitting device 100 can detect whether there are objects in a charging area, based on a change in power for an object detection signal (for example, a change in current in the coils). In this case, the object detection signal can be an analog ping (AP) signal with a very short pulse. The wireless power transmitting device 100 can send out an analog ping (AP) signal at predetermined intervals until detecting any object on the charging surface.

In the case where the wireless power transmitting device 100 has a plurality of transmitter coils 181 to 184, the wireless power transmitting device 100 can send out an object detection signal in a predetermined sequence, through the plurality of transmitter coils 181 to 184, and detect whether there is any object in the charging area based on the amount of current change in the coils in response to each object detection signal.

Specifically, if the amount of current change is equal to or greater than a preset amount of current change, the wireless power transmitting device 100 can calculate that there is an object in the charging area of the corresponding coil. In this case, the corresponding coil can be called an effective coil used for a combination of effective coils to be described later.

In the selection phase S610, the wireless power transmitting device 100 can calculate whether there is a foreign object in the charging area. The foreign object can be a metal object including a coin, key, etc. Such a foreign object can be called an FO.

In the selection phase S610, the wireless power transmitting device 100 can continuously detect a placement or removal of an object within a detection area. Also, in the selection phase S610, if the wireless power transmitting device 100 detects an object within a detection area, it can transition to the ping phase S620.

If the wireless power transmitting device 100 detects an object, the wireless power transmitting device 100 can awake the wireless power receiving device 200 in the ping phase S620 and transmit a receiving device detection signal Sd to identify whether the detected object is the wireless power receiving device 200 or not. The receiving device detection signal can be a digital ping (DP) signal.

The digital ping (DP) signal can have a longer duty cycle than the analog ping (AP) signal, in order to attempt to set up communication with the wireless power receiving device 200.

The wireless power receiving device 200 can modulate the digital ping (DP) signal and transmit the modulated digital ping (DP) signal to the wireless power transmitting device 100. The modulated digital ping (DP) signal can be referred to as a response signal Sr. The response signal Sr can be a signal that indicates to the wireless power receiving device 200 the strength of the power received by the wireless power receiving device 200.

The wireless power transmitting device 100 can demodulate the modulated digital ping (DP) signal and acquire digital detection data from the demodulated digital ping (DP) signal, as a response to the receiving device detection signal.

The wireless power transmitting device 100 can recognize the wireless power receiving device 200 to which power will be transmitted, from the digital detection data.

In the ping phase S620, the wireless power transmitting device 100 can transition to the identification and configuration phase S630 upon identifying the wireless power receiving device 200.

Alternatively, in the ping phase S620, the wireless power transmitting device 100 can transition back to the selection phase S610 if it receives no digital detection data.

In the identification and configuration phase S630, the wireless power transmitting device 100 can receive identification information, power information, etc. from the wireless power receiving device 200 and control power transfer in an efficient way.

First of all, in the identification and configuration phase S630, the wireless power receiving device 200 can transmit identification data.

The identification data can comprise version information of wireless power transfer protocols, manufacturer information of the wireless power receiving device 200, default device identifier information, information representing the presence or absence of an extended device identifier, and so on.

Moreover, in the identification and configuration phase S630, the wireless power receiving device 200 can transmit power data.

The power data can comprise information on the maximum power of the wireless power receiving device 200 information on the remaining power, power class information, and so on.

Based on the identification data and the power data, the wireless power transmitting device 100 can identify the wireless power receiving device 200 and acquire power information of the wireless power receiving device 200.

Once the wireless power transmitting device 100 identifies the wireless power receiving device 200 and acquires power information of the wireless power receiving device 200, it can transition to the handover phase S630.

Alternatively, in the identification and configuration phase S630, the wireless power transmitting device 100 can transition to the selection phase S610 if it receives no identification data and/or no power data.

In the handover phase S640, the wireless power transmitting device 100 can calculate whether to change the method of communication with the wireless power receiving device 200.

Specifically, the wireless power transmitting device 100, while communicating with the wireless power receiving device 200 via in-band communication, can calculate whether to maintain in-band communication or switch to out-of-band communication, based on the power information of the wireless power receiving device 200 acquired in at least one of the selection phase S610, ping phase S620, and identification and configuration phase S630.

Meanwhile, the wireless power transmitting device 100 can calculate whether it is necessary to proceed to the negotiation phase S650, based on a negotiation field value received in the identification and configuration phase S630 or handover phase S640.

If the result of the calculation shows that negotiation is required, the wireless power transmitting device 100 can transition to the negotiation phase S650 and perform a foreign object detection (FOD) procedure.

On the contrary, if the result of the calculation shows that negotiation is not required, the wireless power transmitting device 100 can transition immediately to the power transfer phase S670.

In the selection phase S610 or negotiation phase S650, the wireless power transmitting device 100 can determine whether to proceed to the calibration phase S660 or not, based on the presence or absence of a foreign object on the charging surface.

If no foreign object is detected, the wireless power transmitting device 100 can transition to the power transfer phase S670 after going through the calibration phase S660.

Otherwise, if a foreign object is detected, the wireless power transmitting device 100 can transition to the selection phase S610 without performing power transfer.

In the calibration phase S660, the wireless power transmitting device 100 can calculate power loss based on a difference between the transmission power of the wireless power transmitting device 100 and the reception power of the wireless power receiving device 200.

In the power transfer phase S670, the wireless power transmitting device 100 can transmit power to the wireless power receiving device 200.

In the power transfer phase S670, the wireless power transmitting device 100 can receive power control information from the wireless power receiving device 200 during power transmission and adjust the characteristics of the power applied to the coils based on the received power control information.

In the power transfer phase S670, when unexpected data is received, when expected data, for example, power control information, is not received for a predetermined time (i.e., timeout), when a power transfer contact violation occurs, or when charging has ended, the wireless power transmitting device 100 can transition to the selection phase S610.

In addition, in the power transfer phase S670, if a power transfer contract needs to be reconfigured depending on a change in the status of the wireless power transmitting device 100 or wireless power receiving device 200, the wireless power transmitting device 100 can transition to the re-negotiation phase S680. At this time, when re-negotiation is properly done, the wireless power transmitting device 100 can return to the power transfer phase S670.

Figure 7:
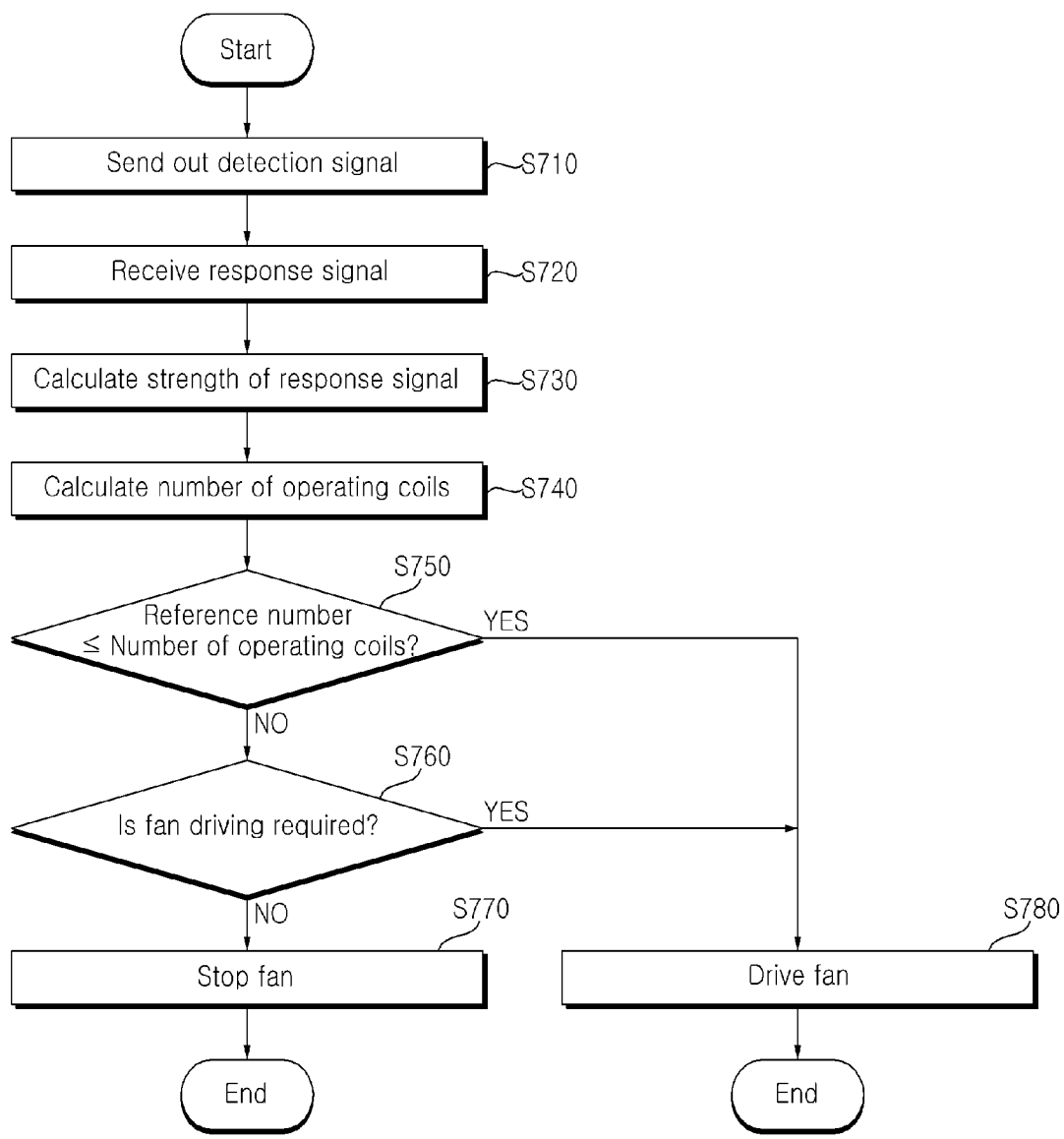
FIG. 7 is a flowchart for explaining a method of driving the fan in the wireless power transmitting device according to an exemplary embodiment of the present invention.

FIG. 7 is a flowchart for explaining a method of driving a fan in the wireless power transmitting device according to an exemplary embodiment of the present invention.

Referring to the drawing, in FIG. 7, the controller 160 can send out a detection signal Sd through the transmitter coil section 180 (S710).

In the ping phase S620 of FIG. 6, the controller 160 can send out a detection signal Sd.

The detection signal Sd can be a digital ping (DP) signal for identifying whether an object on a charging surface is a wirelessly chargeable receiver or not.

The controller 160 can receive a response signal Sr as a response to the detection signal Sd through the transmitter coil section 180 (S720).

The controller 160 can calculate the number of operating coils based on the strength of the response signal Sr to the detection signal Sd.

First of all, the controller 160 can calculate the strength of the response signal Sr to the detection signal Sd (S730).

The response signal Sr can be a signal indicating the strength of the power received by the wireless power receiving device 200.

For example, the higher the strength of the response signal Sr, the greater the power received by the wireless power receiving device 200. In contrast, the lower the strength of the response signal Sr, the smaller the power received by the wireless power receiving device 200.

Meanwhile, since the present invention comprises a plurality of transmitter coils 181 to 184, there is a need to select operating coils used for wireless power transmission, depending on whether they are aligned with the wireless power receiving device 200.

The controller 160 of the present invention can count operating coils used for wireless power transmission based on the strength of the response signal Sr.

The controller 160 can count transmitter coils with a first reference strength or higher as operating coils, among the plurality of transmitter coils 181 to 184.

The first reference strength can be properly set based on the strength of the response signal Sr received by transmitter coils, when aligning the transmitter coils and the receiver coil 281.

Next, the controller 160 can calculate the total number of operating coils used for wireless power transmission by counting operating coils (S740).

Meanwhile, as the power of the wireless power receiving device 200, that is, the amount of power transmission, becomes greater, the number of operating coils can increase, and the temperature of the transmitter coil section 180 therefore can increase.

In this case, if proper temperature control is not performed on the transmitter coil section 180, there is a risk of explosion or fire due to heat generation.

Accordingly, the controller 160 of the present invention can control the fan 131 based on the count of operating coils.

Specifically, the controller 160 can calculate if there are a reference number of operating coils or more (S750).

The reference number can be properly set based on the amount of wirelessly transmitted power. For example, in a case where the transmitter coil section 180 has first to fourth transmitter coils 181 to 184, the reference number can be 2. In this instance, the amount of transmitted power can be 30 W.

If there are a preset reference number of operating coils or more, among the plurality of transmitter coils 181 to 184, the controller 160 can control the fan 131 to be driven (S780).

For example, in a case where the transmitter coil section 180 has first to fourth transmitter coils 181 to 184 and there are two or more operating coils, the fan 131 can be controlled to be driven.

Meanwhile, even if the number of operating coils is below the preset number, when the wireless power transmitting device 100 fast-charges the wireless power receiving device 200, the temperature of the transmitter coil section 180 can rise abruptly.

For example, when the wireless power transmitting device 100 fast-charges the wireless power receiving device 200 after the wireless power transmitting device 100 and the wireless power receiving device 200 get authenticated for EPP (Extended Power Profile) according to WPC, the temperature of the transmitter coil section 180 can rise abruptly.

Accordingly, the temperature of the transmitter coil section 180 needs to be lowered even when the wireless power receiving device 200 is fast-charged.

The controller 160 can calculate whether fan driving is required or not, when there are fewer operating coils than the reference number (S760).

Even if there are fewer operating coils than the reference number, the controller 160 can control the fan 131 to be driven as long as at least one transmitter coil has a second reference strength or above, which is higher than the first reference strength (S780).

Since the strength of received power becomes higher during fast charging, the strength of a response signal Sr received by the wireless power transmitting device 100 also can become higher. Therefore, if the strength of the response signal Sr corresponds to the second reference strength which is higher than the first reference strength, the controller 160 can count the wireless power receiving device 200 as a device that supports fast charging.

When fast-charging the wireless power receiving device 200, the controller 160 can drive the fan 131 even if there are fewer operating coils than the reference number.

For example, even in a case where the transmitter coil section 180 has first to fourth transmitting coils 181 to 184 and there is only one operating coil, the controller 160 can drive the fan 131 as long as the transmitter coil section 180 fast-charges the wireless power receiving device 200. Meanwhile, the amount of power transmitted by each transmitter coil in standard charging mode can be 15 W, whereas the amount of power transmitted by each transmitter coil in fast charging mode can be 24 W.

In the meantime, if there are fewer operating coils than the reference number and all the transmitter coils have a strength below the second reference strength, the controller 160 can control the fan 131 to stop it (S770).

As described above, in the present invention, it is possible to avoid the risk of fire or explosion due to heat generated from the transmitter coil section 180 by controlling the fan 131 according to the number of operating coils and the charging mode, even without a temperature sensor.

Figure 8:
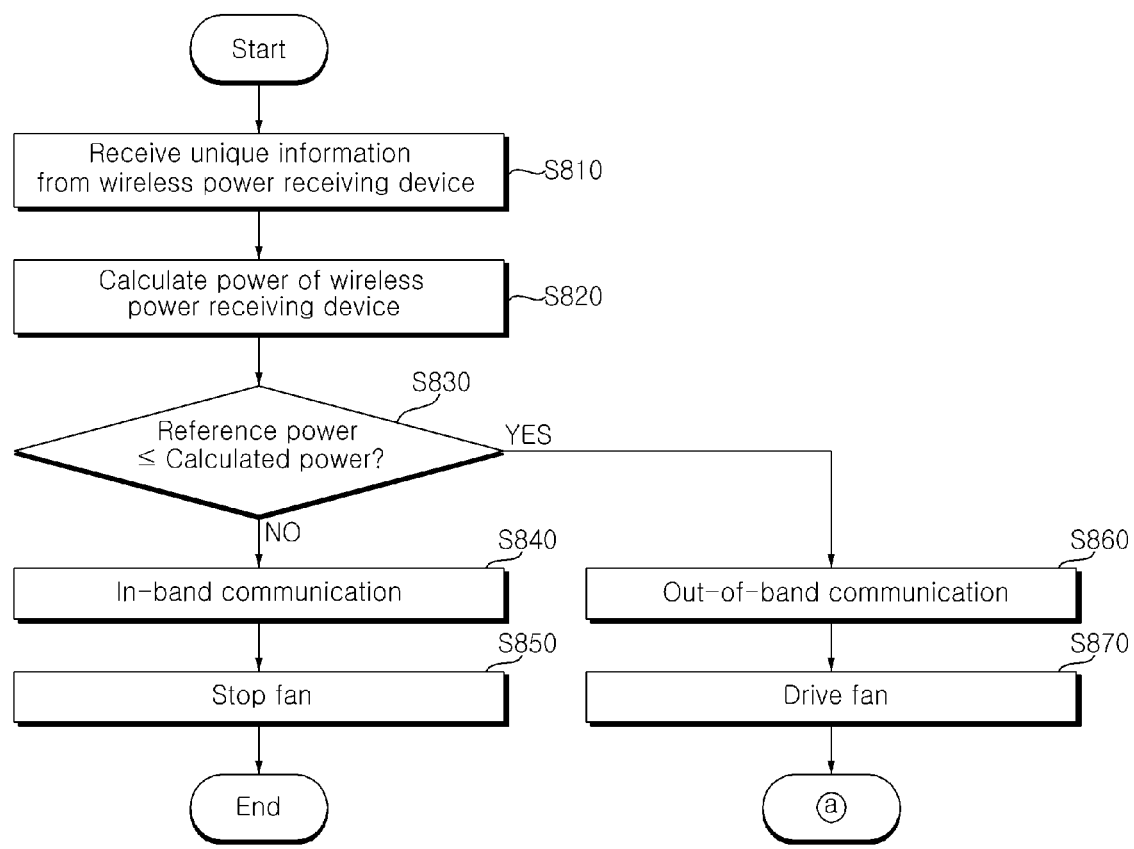
FIG. 8 is a flowchart for explaining a method of driving the fan in the wireless power transmitting device according to another exemplary embodiment of the present invention.
Figure 9:
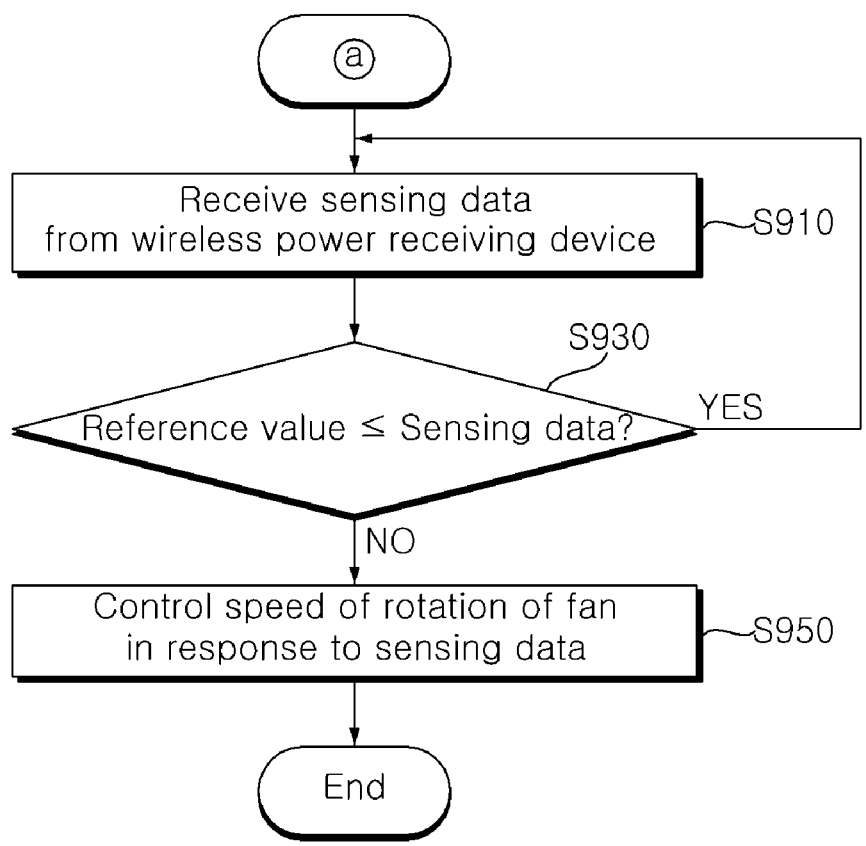
FIG. 9 is a flowchart for explaining a method of driving the fan in the wireless power transmitting device according to another exemplary embodiment of the present invention.

FIGS. 8 and 9 are flowcharts for explaining a method of driving the fan in the wireless power transmitting device according to another exemplary embodiment of the present invention.

Referring to the drawings, the wireless power transmitting device 100 can communicate with the wireless power receiving device 200 via in-band communication.

In in-band communication, the wireless power transmitting device 100 can modulate a first transmission packet containing various control information by FSK (frequency-shift keying) communication and transmit it to the wireless power receiving device 200.

Also, in-band communication, the wireless power transmitting device 100 can modulate a second transmission packet by ASK (amplitude-shift keying) communication and transmit it to the wireless power receiving device 200.

The second transmission packet can contain information on the strength of current applied to the receiver coil 281, information on the power required by a load, received power strength information, status information, and so on.

The second transmission packet can contain unique information RXID of the wireless power receiving device 200.

Meanwhile, the FSK communication is an advantage only when a transmission packet of several bytes is transmitted, but is problematic in that the transmission rate decreases as the capacity of the transmission packet becomes higher.

Particularly, the capacity of data to be transmitted for authentication or control of the wireless power receiving device 200 increases as the power of the wireless power receiving device 200 becomes greater. Thus, a large-capacity wireless power receiving device 200 can need more communication time. This increase in communication time can result in an increase in charging time.

To overcome these problems, the controller 160 can vary the method of communication depending on the charging power of the wireless power receiving device 200.

First of all, the transmitter coil section 180 can receive unique information RXID from the wireless power receiving device 200 (S810).

The wireless power receiving device 200 can transmit unique information RXID of the wireless power receiving device 200 via in-band communication upon a request from the wireless power transmitting device 100 or at certain time intervals. The unique information RXID can contain product information, particularly, charging power information, of the wireless power receiving device 200, etc.

For example, if the wireless power receiving device 200 is a mobile terminal, the charging power of the wireless power receiving device 200 can be 15 W. Also, if the mobile terminal supports fast charging, the charging power can be 24 W.

The wireless power transmitting device 100 can receive unique information RXID from at least one of the selection phase S610, ping phase S620, and identification and configuration phase S630 of FIG. 6.

The controller 160 can calculate the power of the wireless power receiving device 200 based on the unique information RXID of the wireless power receiving device 200 which is received through the transmitter coil section 180 (S820). In this case, the power can refer to the charging power of the wireless power receiving device 200.

The controller 160 can change the method of communication with the wireless power receiving device 200 based on the calculated power.

Specifically, the controller 160 can calculate whether the calculated power falls within a reference power level or not (S830).

The reference power level can be properly set in consideration of a communication load caused by an increase in the charging power of the wireless power receiving device 200. For example, the reference power level can be 30 W.

The controller 160 can control the fan 131 based on whether the method of communication is changed or not.

The controller 160 can maintain in-band communication if the calculated power is less than the reference power level (S840).

For example, the controller 160 can maintain in-band communication if the calculated power is less than 30 W.

In this instance, the controller 160 can communicate with the wireless power receiving device 200 via in-band communication through the first communication part 140.

The first communication part 140 can process status information, power control information, etc. of the wireless power transmitting device 100 into a predetermined signal and transmit it to the wireless power receiving device 200 via in-band communication, and can receive status information, power usage information, charging efficiency information, etc. of the wireless power receiving device 200 via in-band communication, process them into a predetermined signal, and then transmit it to the controller 160.

In some embodiments, the first communication part 140 can be included as a component in the controller 160.

The controller 160 can control the fan 131 to stop it when communicating with the wireless power receiving device 200 via in-band communication.

Meanwhile, while the controller 160 is communicating with the wireless power receiving device 200 via in-band communication, if the charging power of the wireless power receiving device 200 is equal to or higher than the reference power level, the controller 160 can change the method of communication and communicate with the wireless power receiving device 200 via out-of-band communication (S860).

For example, if the calculated power is equal to or higher than 30 W, the controller 160 can change the method of communication and communicate with the wireless power receiving device 200 via out-of-band communication.

The controller 160 can communicate with the wireless power receiving device 200 via out-of-band communication through the second communication part 150.

The second communication part 150 can process status information, power control information, etc. of the wireless power transmitting device 100 into a predetermined signal and transmit it to the wireless power receiving device 200 via out-of-band communication, and can receive status information, power usage information, charging efficiency information, etc. of the wireless power receiving device 200 via out-of-band communication, process them into a predetermined signal, and then transmit it to the controller 160.

The out-of-band communication can be any one of the following: Bluetooth communication, BLE (Bluetooth low energy) communication, NFC (near field communication), RFID (radio frequency identification) communication, and Zigbee communication.

The second communication part 150 can come in the form of a module and be provided in the wireless power transmitting device 100.

For example, a BLE communication module, within the wireless power transmitting device 100, can be electrically connected to the controller 160. In this case, the controller 160 can receive a device address of the wireless power receiving device 200 via in-band communication and perform pairing with the wireless power receiving device 200 based on the device address. The device address can be included in the unique information RXID of the wireless power receiving device 200 which is received in the S810.

Moreover, the controller 160, when paired with the wireless power receiving device 200, can change the method of communication and communicate with the wireless power receiving device 200 via BLE.

Once the method of communication with the wireless power receiving device 200 is changed, the controller 160 can control the fan 131 to be driven (S870).

Meanwhile, as the charging of the wireless power receiving device 200 proceeds while the fan 131 is being driven, the current flowing through the receiving coil 281 and/or the voltage between both ends of the receiver coil 281 can decrease gradually. Thus, the temperature of the transmitter coil section 180 also can decrease.

If the controller 160 drives the fan 131 at the maximum speed while the current flowing through the receiving coil 281 and/or the voltage between both ends of the receiver coil 281 is decreasing gradually, this leads to an increase in noise as well as power consumption.

Accordingly, in the present invention, the speed of rotation of the fan 131 can be controlled in response to the current flowing through the receiving coil 281 and/or the voltage between both ends of the receiver coil 281.

Specifically, the wireless power receiving device 200 can detect the current flowing through the receiving coil 281 and/or the voltage between both ends of the receiver coil 281.

The wireless power receiving device 200 can transmit the current flowing through the receiving coil 281 and/or the voltage between both ends of the receiver coil 281 in the form of sensing data to the wireless power transmitting device 100.

The wireless power receiving device 200 can transmit sensing data to the wireless power transmitting device 100 via out-of-band communication.

The transmitter coil section 180 can receive sensing data from the wireless power receiving device 200 at predetermined intervals while the fan 131 is being driven (S910).

The transmitter coil section 180 can receive sensing data at predetermined intervals via out-of-band communication with the wireless power receiving device 200.

The controller 160 can calculate if the sensing data are of a reference value or higher (S930).

The reference value can be properly set depending on the temperature of the transmitter coil section 180. The reference value is derived by a test and can be stored in the memory 120.

If the sensing data are of a preset reference value or higher, the controller 160 can control the fan 131 to keep it running.

If the sensing data are of less than the preset reference value, the controller 160 can control the speed of rotation of the fan 131 in response to the sensing data (S950).

For example, the controller 160 can control the fan 131 to be driven at a lower speed as the value of the sensing data (voltage and/or current) decreases.

The controller 160 according to the present invention can be implemented as a processor-readable code on a processor-readable recording medium provided in the power transmitting device 100. The processor-readable recording medium includes all kinds of recording media that store data readable by the processor. Examples of the processor-readable recording medium include a ROM, a RAM, a CD-ROM, a magnetic tape, a floppy disk, an optical data storage, etc., and also can be implemented in the form of a carrier wave such as transmission over the internet. The processor-readable recording medium can be distributed over a plurality of computer systems connected to a network so that processor-readable code can be stored and executed in a distributed manner.

Further, although the embodiments of this specification have been illustrated and described above, this specification is not limited to the aforementioned specific embodiments, various modifications can be made by a person with ordinary skill in the technical field to which the present invention pertains without departing from the subject matters of the present invention that are claimed in the claims, and these modifications should not be appreciated individually from the technical spirit or prospect of the present invention.

A wireless power transmitting device according to an exemplary embodiment of the present invention is able to calculate the required number of operating coils and control the fan efficiently based on the calculated number of operating coils.

Moreover, if the required number of operating coils is less than a reference number, the wireless power transmitting device stops driving the fan, instead of keeping the fan running. Thus, noise and power consumption caused by the driving of the fan can be reduced.

Additionally, the wireless power transmitting device is able to charge a wireless power receiving device more efficiently because it varies the number of operating coils depending on the power of the wireless power receiving device.

Furthermore, the wireless power transmitting device is compatible with a wireless power receiving device with varying amounts of power because it varies the number of operating coils depending on the power of the wireless power receiving device.

A wireless power transmitting device according to another exemplary embodiment of the present invention is able to change the method of communication to out-of-band communication when charging a large-capacity wireless power receiving device, thereby solving the problem of high-frequency noise which is generated when a high-volume data packet is modulated in in-band communication.

Moreover, the wireless power transmitting device is able to change the method of communication to out-of-band communication when charging a large-capacity wireless power receiving device, thereby avoiding any delay in transmission rate even when a high-volume data packet is transmitted, and improving the reliability of communication.

Additionally, the wireless power transmitting device offers an energy-saving effect because it adaptively controls the speed of rotation of the fan in response to the current flowing through the receiver coil or the voltage between both ends of the receiver coil.

What is claimed is:

1. A wireless power transmitting device comprising:
a transmitter coil section including a plurality of transmitter coils that are partially overlapping with each other:
a fan selectively driven to cool down at least a part of the transmitter coil section; and
a controller configured to:
output a detection signal through the transmitter coil section,
determine the number of operating coils based on a strength of a response signal to the detection signal, and
drive or stop the fan based on the determined number of operating coils,
wherein, for determining the number of operating coils, the controller counts one or more transmitter coils that have received a response signal having a first reference strength, as the operating coil(s), among the plurality of transmitter coils, and
when the determined number of operating coils is equal to or greater than a preset reference number, the controller drives the fan to cool down at least one operating coil.

2. The wireless power transmitting device of claim 1, wherein, when the determined number of operating coils is less than a preset reference number and when at least one of the plurality of transmitter coils has received a response signal having a second reference strength or above, the controller drives the fan to cool down at least one operating coil,
where the second reference strength is higher than the first reference strength.

3. The wireless power transmitting device of claim 2, wherein a strength of the detection signal is set by compensating for a distance between each operating coil and a charging surface where a wireless power receiving device is placed.

4. The wireless power transmitting device of claim 3, wherein the strength of the detection signal is set to increase as the distance between the charging surface and each operating coil becomes greater.

5. The wireless power transmitting device of claim 4, wherein the strength of each detection signal on the charging surface where the wireless power receiving device is placed, is the same.

6. The wireless power transmitting device of claim 5, wherein the strength of the detection signal that has been compensated has a factory-calibrated value.

7. The wireless power transmitting device of claim 6, wherein the plurality of transmitter coils have a same configuration.

8. The wireless power transmitting device of claim 7, wherein the detection signal is a digital ping (DP) signal for identifying whether or not an object on the charging surface is a wirelessly chargeable receiver.

9. A wireless power transmitting device comprising:
   a transmitter coil section including a plurality of partially overlapping transmitter that are partially overlapping with each other,
   the transmitter coil section configured to receive unique information of a wireless power receiving device;
   a fan configured to cool down at least a part of the transmitter coil section;
   a first communication unit configured to communicate with the wireless power receiving device via in-band communication;
   a second communication unit configured to communicate with the wireless power receiving device via out-of-band communication; and
   a controller configured to:
   determine power of the wireless power receiving device based on the unique information of the wireless power receiving device,
   determine whether to communicate with the wireless power receiving device through the first communication unit or the second communication unit to set a communication method based on the determined power of the wireless power receiving device, and
   control the fan based on whether or not the communication method is changed.

10. The wireless power transmitting device of claim 9, wherein, while the controller is communicating with the wireless power receiving device via the in-band communication,
   if the determined power of the wireless power receiving device is equal to or higher than a reference power level, the controller changes to communicate with the wireless power receiving device through the second communication unit, and start to communicate with the wireless power receiving device via the out-of-band communication.

11. The wireless power transmitting device of claim 9, wherein, when the second communication unit is driven, the controller drives the fan to cool down at least the part of the transmitter coil section.

12. The wireless power transmitting device of claim 11, wherein the transmitter coil section receives sensing data from the wireless power receiving device at predetermined intervals while the fan is being driven.

13. The wireless power transmitting device of claim 12, wherein, when the sensing data has a value equal to or greater than a preset reference value, the controller continues to drive the fan to keep running.

14. The wireless power transmitting device of claim 12, wherein, when the sensing data has a value less than a preset reference value, the controller drives the fan and controls a speed of a rotation of the fan in response to the sensing data.

15. The wireless power transmitting device of claim 14, wherein the fan is driven at a lower speed as the value of the sensing data decreases.

16. The wireless power transmitting device of claim 12, wherein the sensing data corresponds to a current flowing in a receiver coil provided in the wireless power receiving device or a voltage between ends of the receiver coil.

17. The wireless power transmitting device of claim 12, wherein the transmitter coil section receives the sensing data at the predetermined intervals via the out-of-band communication.

18. The wireless power transmitting device of claim 9, wherein the plurality of transmitter coils have a same configuration.

19. A wireless power transmitting device comprising:
   a transmitter coil section including a plurality of transmitter coils that are partially overlapping with each other:
   a fan selectively driven to cool down at least a part of the transmitter coil section and
   a controller configured to:
   output a detection signal through the transmitter coil section,
   determine the number of operating coils based on a strength of a response signal to the detection signal, and
   drive or stop the fan based on the determined number of operating coils,
   wherein, for determining the number of operating coils, the controller counts one or more transmitter coils that have received a response signal having a first reference strength, as the operating coil(s), among the plurality of transmitter coils, and
   wherein, when the determined number of operating coils is less than a preset reference number and when at least one of the plurality of transmitter coils has received a response signal having a second reference strength or above, the controller drives the fan to cool down at least one operating coil,
   where the second reference strength is higher than the first reference strength.

20. The wireless power transmitting device of claim 19, wherein a strength of the detection signal is set by compensating for a distance between each operating coil and a charging surface where a wireless power receiving device is placed.

* * * * *